Patented Aug. 12, 1930

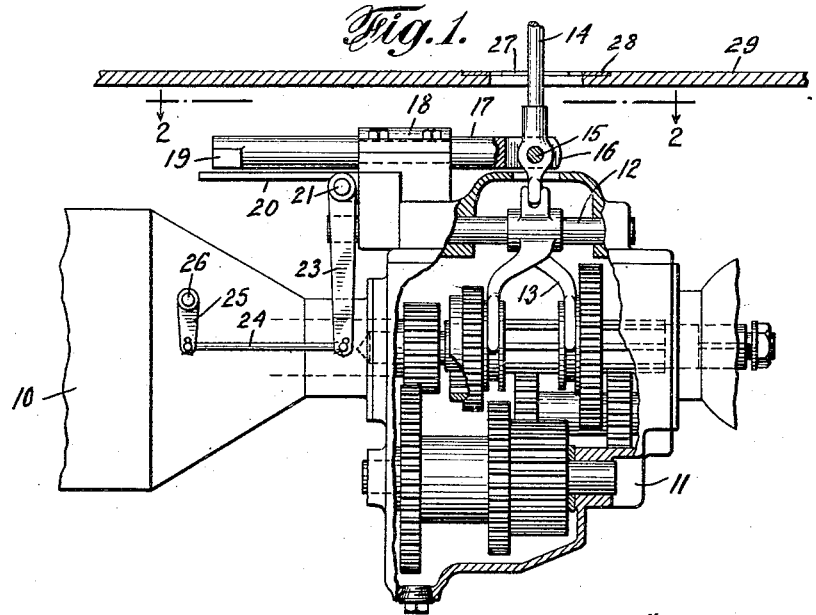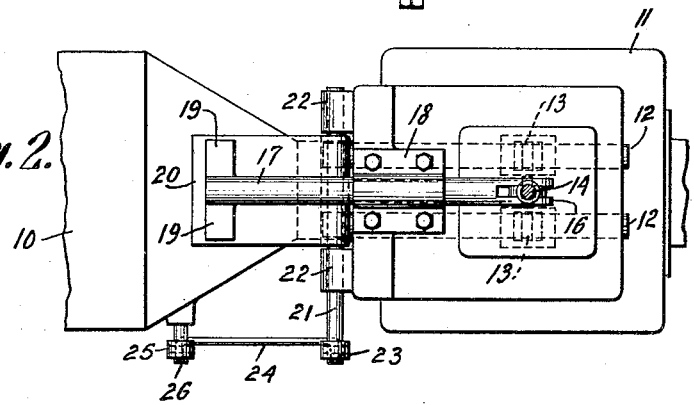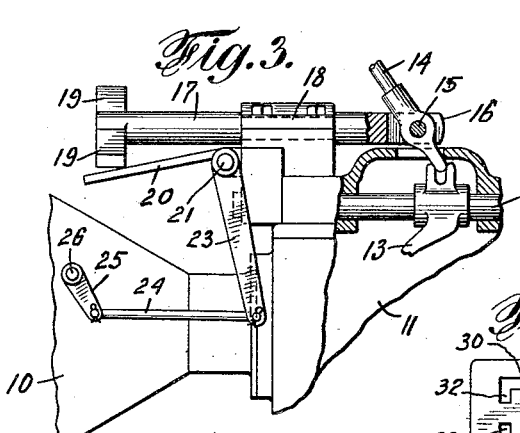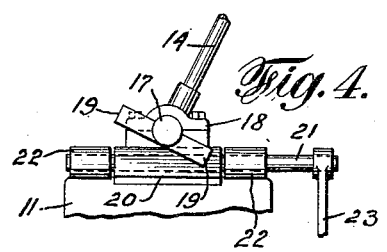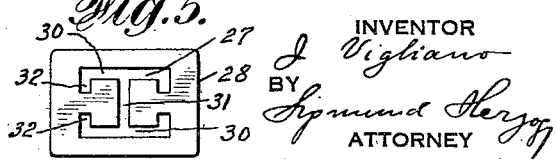

1,772,764

UNITED STATES PATENT OFFICE

JOSEPH VIGLIANO, OF NEW YORK, N. Y.

GEAR-SHIFTING MECHANISM

Application filed August 23, 1929. Serial No. 387,919.

The present invention relates to improvements in the mechanism for operating the transmission gearing of an automobile.

In the normal operation of an automobile, the transmission gearing may be set for a desired speed by the usual hand shift lever after first disengaging the driving shaft thereof from the motor. The said driving shaft and motor are connected by a clutch mechanism, and the latter mechanism is actuated through the ordinary clutch pedal. In order to effect a change of speed, the operator therefore actuates two elements, that is to say the clutch pedal and the hand shift lever. Actually three operations are necessary to effect a change of speed, to wit: The elements of the clutch must first be disengaged, the gears thereafter shifted, and the clutch elements brought into engagement after the shifting operation.

The main object of the present invention is to provide a novel mechanism whereby the transmission gearing of an automobile may be set for a desired speed through the ordinary hand shift lever, the usual clutch pedal being dispensed with.

Another object of the invention is to provide a simple connection between the clutch shaft and the hand-shift lever and to so mount the said lever that through the said connection it disengages and engages the clutch elements as the said lever is being shifted in the usual manner to effect changes in speed through the transmission gearing.

With these and other objects in view, which will more fully appear as the nature of the invention is better understood, the same consists in the combination, arrangement and construction of parts hereinafter described, pointed out in the appended claim and illustrated in the accompanying drawings, it being understood that many changes may be made in the size and proportion of the several parts and details of construction within the scope of the appended claim, without departing from the spirit or sacrificing any of the advantages of the invention.

One of the many possible embodiments of the invention is illustrated in the accompanying drawings, in which:—

Figure 1 is a side elevation, partly in section, of an automobile clutch mechanism, the transmission gearing and the improved gear shifting mechanism; Fig. 2 is a top plan view thereof; Fig. 3 is a side elevation and section similar to the one shown in Fig. 1 of the drawings, certain of the elements being in other positions; Fig. 4 is a front elevation of some of the elements shown in Fig. 3; and Fig. 5 is a top plan view of a guide plate co-operating with the hand shift lever.

In the drawings, the numeral 10 indicates the clutch case of an automobile and the numeral 11 a sliding gear transmission, associated with the clutch in the usual manner and including shift bars 12, which are slidably mounted in the transmission case and equipped with gear shifting forks or yokes 13 of any preferred construction. The shifting bars are operated by a hand lever 14, which is pivotally mounted at 15 in the fork-shaped end 16 of a rod 17, the latter being oscillatably mounted in a bearing 18. This bearing is rigidly secured to the top of the transmission case. On diametrically opposite portions of the forward end of the rod 17 are formed laterally extending projections 19, which are adapted to co-operate with a plate member 20, disposed in front of the bearing 18 below the rod 17 and keyed or otherwise attached to a horizontally extending spindle 21. This spindle is journaled in bearings 22 on the transmission case 11 and has fixed to one of its ends a crank arm 23, connected by a link 24 with a crank arm 25, the latter being keyed or otherwise fixed to the clutch shaft 26.

The hand shift lever 14 extends through a guide slot 27 in a plate 28, the latter being fixed in the usual manner to the floor board 29 below the automobile operator's seat. This slot is substantially H-shaped, as usual in constructions of this type. It includes two parallel longitudinal sections 30, connected by a central transverse section 31. On each end of each longitudinal section 30 is formed a notch 32, extending in parallel relation to the transverse section 31 and projecting toward the other one of the longitudinal sections 30. The purpose of this arrangement will appear hereinafter.

The operation of this device is as follows: In the position of the elements shown in Figs. 1 and 2 of the drawings, the transmission gears are in neutral position; in which case the hand lever 14 extends vertically, it being centrally disposed in the transverse section 31 of the H-shaped slot 27. Assuming that the gears are to be set to first speed, the operator shifts the lever 14 from the central position in the section 31 of the H-shaped slot until the lever arrives in the proper longitudinal sections 30 of the said slot. In doing so the rod 17 is given an angular turn in the bearing 18, whereby one of the projections 19 depresses the plate member 20, bringing it into the position shown in Fig. 3 of the drawings, whereby the clutch shaft 26 is turned in the same manner as if operated by the ordinary clutch pedal. In other words, when the hand shift lever 14 is moved laterally in the transverse section 31 of the H-slot, the elements of the clutch are disengaged, to permit shifting of the gears. Thereafter the operator shifts the lever 14 toward one of the ends of the longitudinal slot section 30 in which it is seated, thereby shifting the gears. While so moving the lever 14 the clutch elements are kept in their disengaged positions, as appears from Fig. 3 of the drawings. When now, at the end of the slot section the lever 14 is rocked inwardly, that is to say toward the longitudinal center line of the H-shaped slot as far as the respective notch 32 permits, the projection 19 on the rod 17 is disengaged from the plate member 20, whereby the elements of the clutch are brought into engagement and motion is transmitted to the driven element of the transmission. When returning to neutral position, it is obvious that the operations are performed in the reverse order, the elements of the clutch being first disengaged by rocking the hand shift lever so as to bring it into engagement with the respective longitudinal slot section 30, after which the lever is shifted in the said longitudinal section until it is brought into alignment with the transverse section 31 of the H-shaped slot, when the hand shift lever is rocked to bring it into central position in the last-mentioned section of said slot. The same conditions prevail when going from first speed to second and third speeds, and also when reversing.

From the foregoing it appears that all selecting and shifting is accomplished by the usual movements of the hand shift lever, with the exception that when the gears are brought into mesh the said lever is rocked toward the longitudinal center line of the H-shaped slot in order to engage the clutch elements.

What I claim is:—

The combination with a change-speed gear, of a clutch including a clutch shaft, a rod oscillatably mounted on said change-speed gear, a hand shift lever pivoted to said rod provided on diametrically opposite points thereof with two projections, a plate member pivotally mounted on said change-speed gear below said rod in operative relation to the latter, a connection between said plate member, and said clutch shaft, whereby the elements of said clutch are disengaged when said hand shift lever is rocked laterally from neutral position by causing one of said projections to act upon said plate member and the elements of said clutch are engaged when said hand shift lever is rocked in the opposite direction, a change in speed being effected by shifting said hand shift lever longitudinally on said change-speed gear.

Signed at New York city, in the county of New York, and State of New York, this 20th day of August, A. D. 1929.

JOSEPH VIGLIANO.